United States Patent [19]

Totsuka et al.

[11] Patent Number: 6,014,731
[45] Date of Patent: Jan. 11, 2000

[54] DISK CONTROL METHOD AND CONTROL APPARATUS CAPABLE OF LOWERING DATA TRANSFER LOAD OF COMPUTER BY ACCESSING A CONTINUOUS, LARGER HEAD PORTION OF DATA, ALLOCATING ADDRESSES WITHIN EMPTY TIME, AND RESPONDING TO PRIORITY ORDERS OF DATA

[75] Inventors: Takashi Totsuka, Chiba; Yasunobu Kato, Kanagawa; Noboru Oya; Hiroyuki Shioya, both of Tokyo, all of Japan

[73] Assignee: Sony Corporation, Tokyo, Japan

[21] Appl. No.: 08/497,225

[22] Filed: Jun. 28, 1995

[30] Foreign Application Priority Data

Jun. 30, 1994 [JP] Japan .................. P06-148855

[51] Int. Cl.⁷ .................................................. G06F 12/10
[52] U.S. Cl. .................. 711/202; 711/206; 711/218; 711/4; 711/170; 360/71; 369/30
[58] Field of Search .................. 360/72.1, 71; 395/412, 395/415, 417, 421.07, 421.08; 369/32, 30; 711/202, 205, 207, 217, 218, 221, 4, 170, 206

[56] References Cited

U.S. PATENT DOCUMENTS

| | | | |
|---|---|---|---|
| 4,435,752 | 3/1984 | Winkelman | 395/621 |
| 4,691,281 | 9/1987 | Furui | 395/417 |
| 4,758,951 | 7/1988 | Sznyter, III | 395/416 |
| 4,939,598 | 7/1990 | Kulakowski et al. | 360/48 |
| 4,953,122 | 8/1990 | Williams | 395/404 |
| 5,119,291 | 6/1992 | Flannagan et al. | 711/4 |
| 5,129,088 | 7/1992 | Auslander et al. | 395/401 |
| 5,315,314 | 5/1994 | Harrison et al. | 345/186 |
| 5,386,402 | 1/1995 | Iwata | 369/32 |
| 5,404,477 | 4/1995 | Jippo | 395/413 |
| 5,463,776 | 10/1995 | Voigt et al. | 707/101 |
| 5,559,979 | 9/1996 | Shiga et al. | 395/421.08 |
| 5,586,280 | 12/1996 | Simms | 395/404 |
| 5,636,075 | 6/1997 | Nishimura et al. | 360/48 |

OTHER PUBLICATIONS

Peter Norton, The Norton Utilities Version 5.0, Peter Norton Computing, Inc. User's Guide pp. 135–152, Disk Explorer pp. 42–47, 1990.

*Primary Examiner*—Eddie P. Chan
*Assistant Examiner*—Hong Kim
*Attorney, Agent, or Firm*—Limbach & Limbach L.L.P.

[57] ABSTRACT

In a storage disk control apparatus, a load of a computer caused by transferring data is reduced, and a waiting time until a data transfer operation is commenced is shortened. In the disk control method for controlling a disk apparatus including a disk having a plurality of storage regions for storing data therein by way of an external apparatus external addresses produced from the external apparatus are related to internal addresses indicative of positions of the storage regions the external addresses are converted into the internal addresses related thereto, and the disk is accessed based on the internal addresses. In the disk control apparatus for controlling a disk apparatus including a disk having a plurality of storage regions used to store therein data, there are provided management means for managing a correspondence relationship between external addresses and internal addresses indicative of positions of the storage regions, and conversion means for converting a preselected external address into the internal address related thereto by the management means and for supplying the converted internal address to the disk.

8 Claims, 10 Drawing Sheets

FIG.2A

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

506

| EXTERNAL ADDRESS | INTERNAL ADDRESS |
|---|---|
| 1 | |
| 2 | |
| 3 | |
| 4 | |
| 5 | |
| 6 | 13 |
| 7 | |
| --- | |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

506

| EXTERNAL ADDRESS | INTERNAL ADDRESS |
|---|---|
| 1 | 11 |
| 2 | 12 |
| 3 | 13 |
| 4 | 14 |
| 5 | 15 |
| 6 | 8 |
| 7 | |
| --- | |

| EXTERNAL ADDRESS | INTERNAL ADDRESS |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | |

| EXTERNAL ADDRESS | INTERNAL ADDRESS |
|---|---|
| 1 | 1 |
| 2 | 11 |
| 3 | 3 |
| 4 | 4 |
| 5 | 5 |
| 6 | 6 |
| 7 | 7 |
| 8 | 8 |
| 9 | 2 |

| EXTERNAL ADDRESS | INTERNAL ADDRESS |
|---|---|
| 1 | 1 |
| 2 | 11 |
| 3 | 3 |
| 4 | 4 |
| 5 | 5 |
| 6 | 6 |
| 7 | 12 |
| 8 | 7 |
| 9 | 2 |

FIG. 5A
DATA ARRANGEMENT ON DISK
| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
FIG. 5B
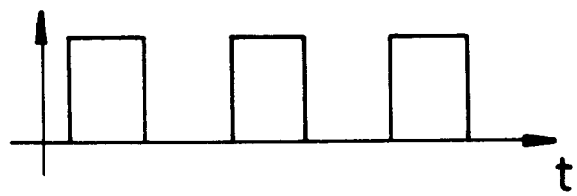
TRANSFER SPEED
FIG. 5C
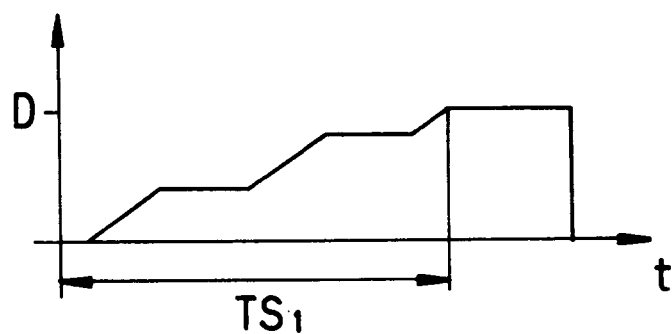
DATA AMOUNT STORED IN BUFFER

FIG.6A
DATA ARRANGEMENT ON DISK
| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
FIG.6B
TRANSFER SPEED
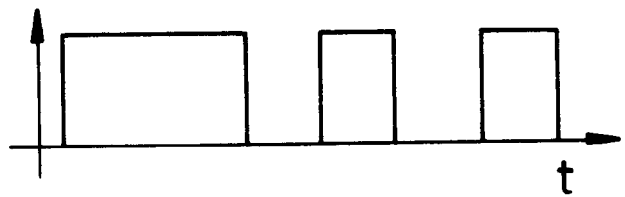
FIG.6C
DATA AMOUNT STORED IN BUFFER
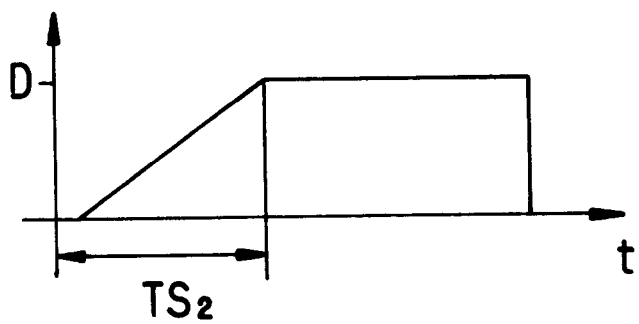

DIRECTORY INFORMATION

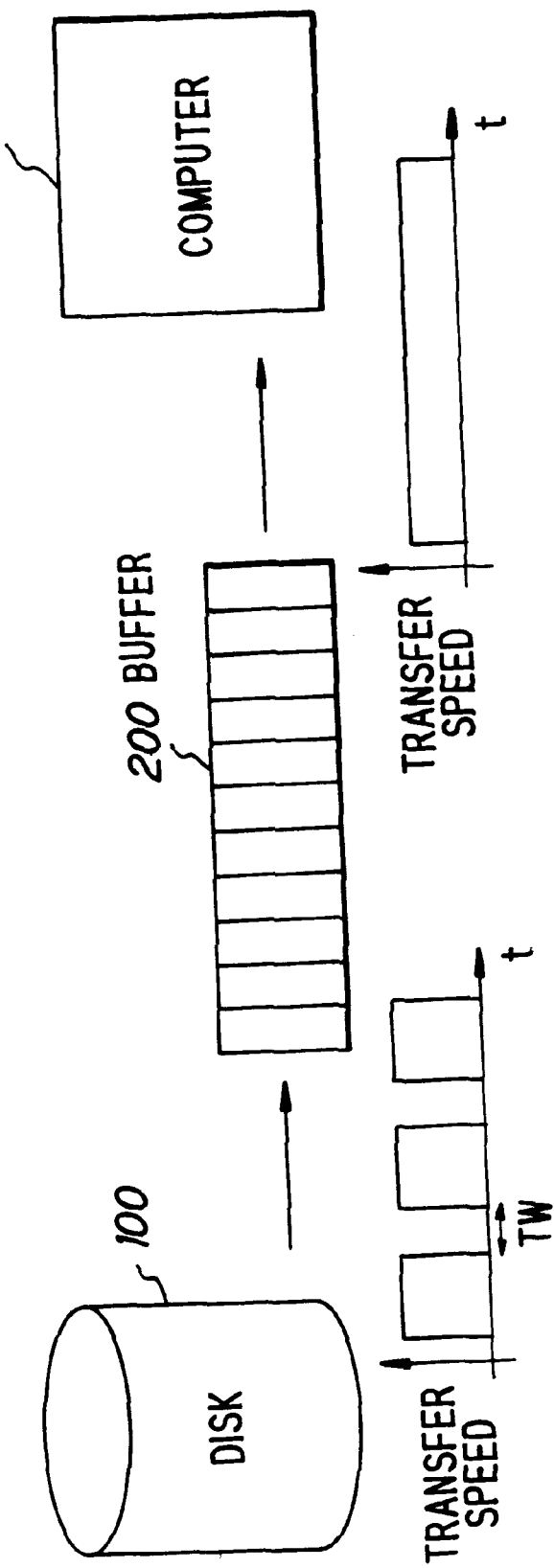

DISK CONTROL METHOD AND CONTROL APPARATUS CAPABLE OF LOWERING DATA TRANSFER LOAD OF COMPUTER BY ACCESSING A CONTINUOUS, LARGER HEAD PORTION OF DATA, ALLOCATING ADDRESSES WITHIN EMPTY TIME, AND RESPONDING TO PRIORITY ORDERS OF DATA

BACKGROUND OF THE INVENTION

1. Field of the Invention

The present invention relates to a disk control method and a disk control apparatus suitable for a storage apparatus of a computer.

2. Description of the Related Art

As major storage apparatuses for computers, storage units having disk shaped recording planes, such as magnetic disks and magneto optical disks, i.e., a so-called "disk unit" are conventionally utilized. A disk unit owns such a structural feature that when storage regions existing at different positions on a recording plane thereof are accessed, a mechanical operation is necessarily required. Accordingly, waiting (latency) time caused by this mechanical operation would greatly deteriorate overall performance of this disk unit.

In an example shown in FIG. 7a, 4 ring-shaped storage regions (tracks t1 to t4) are present on a surface of a rotating disk 100. Each of these ring-shaped storage regions is further subdivided into 8 storage regions along the circumference, so that 32 arc-shaped recording regions (sectors) are formed. Considering now that data is accessed in the order of sectors A, B, C and D, as illustrated in FIG. 7b, a data read/write head 101 must be reciprocated in the radial direction, so that seek time is required for this head reciprocation.

Also, after the head has been transported to a predetermined track, waiting time (relation waiting time) defined by that a desired sector is rotating returned to the position of the head 101 is required.

Recently, on the other hand, although processing speeds of digital circuits are considerably increased, processing speeds (data transfer speeds) of mechanically operated units are not so increased as being expected because there are physical limitations due to strengths and weights of mechanical components. As a consequence, processing speeds of disk units are further relatively lowered as compared with those of digital circuits, and therefore the disk units would mainly impede improvements in the performance of the overall system.

However, on the other hand, a large amount of data such as moving image data is required to be read/written from/into a disk unit, so that higher processing speeds are required for such a disk unit.

FIG. 8 schematically shows the conventional method for storing data into the serially-ordered sectors A to D in synchronization with the rotation of the disk 100. Since the data are stored into the continuous recording (storage) regions in such a manner, the seek time required to transport the head 101 can be reduced to zero and also the rotation waiting time is no longer required, so that the data can be accessed at high speeds.

When, for instance, a computer (not shown in detail) stores the data into the disk 100, if the continuous storage regions are utilized, then such a data arrangement is available and the data can be accessed at high speeds. However, in case that a large amount of data such as moving image data must be processed at high speeds, such a conventional method for continuously using the continuous storage regions would not be practically utilized because the load of the computer becomes heavy. This is because of the below-mentioned reasons.

That is, as the first reason, the computer load becomes large because the data should be processed to be rearranged. For example, as illustrated in FIG. 9, when first data 300 are arranged in all sectors at a track t1 and also a portion of sectors at a track t2, and second data are arranged in all sectors at a track t3, since both of the first data 300 and the second data 301 are arranged in the respective continuous storage regions on the disk 100, these first and second data can be accessed at high speeds.

Further, in order to store such third data requiring 10 sectors of storage regions, the previously existing second data 301 are shifted to either the inner circumference, or the outer circumference (in this case, either track t4 or track t2) so that more than 10 sectors of continuous unused storage regions should be formed. To achieve such a data process operation, the data must be moved and furthermore in conjunction with this data transportation, the information (directory information) for indicating which data is located in which storage region must be updated. As a consequence, the heavy load is given to the computer when the data are transported.

As the second reason, since data is rearranged when the data is commonly shared, a load given to the computer is increased. In many cases, practically speaking, the location of the storage region (internal address) into which predetermined data has been stored is written (stored) into a plurality of different positions of the directory information. Such a condition may occur when preselected images which are usually used are commonly shared in a plurality of moving image sequences (data group).

FIG. 10a represents positions of image data D1 to D4 stored in the disk 100 with respect to the disk 100. The reference numerals given to the respective storage regions (sectors) of the disk 100 show addresses corresponding to these storage regions. FIG. 10b shows the directory information. Into this directory information, moving image sequences 1 and 2 have been stored which are used to read out, for instance, the image data D1 to D4 in accordance with a preselected sequence. In this directory information, addresses of the storage regions into which the image data D1 to D4 are stored are stored in the order to read the image data D1 to D4 shown in FIG. 10a.

In the moving image sequence 1 contained in the directory information shown in FIG. 10b, the image data are accessed in this order of the image data D1, D3, D4 corresponding to the addresses 1, 19, 28 to produce a series of movement on the screen. In the moving image sequence 2, the image data are accessed in this order of the image data D2, D3, D4 corresponding to the addresses 10, 19, 28 to produce a series of movement.

At this time, the image data D3 and D4 are commonly shared by the two moving image sequences 1 and 2. Such a data sharing operation is normally realized by entering the addresses of the storage regions into which the data are stored in the moving image sequences 1 and 2 contained in the directory information. In other words, such a fact that the same addresses are written into a plurality of moving image sequences implied the data stored at this same addresses are commonly shared by these plural moving image sequences.

Under such a circumstance, when data is rearranged, all of the portions where an address of this data has been written should be changed in the directory information in connection with this data rearrangement. In other words, with respect to all of such moving image sequences in which the addresses corresponding to the data to be moved by the data rearrangement, the addresses written therein should be replaced by new addresses. In such an actual condition, namely data sharing condition, the load given to the computer in connection with the data movement is further increased.

As the third reason, the load caused by performing the arrangement process in connection with the data change and the data substitution would be increased. In particular, when moving image data are processed, such operations are frequently performed that a certain amount (equal to several seconds) of image data are replaced by other image data, and the order of these image data is changed. Every time such an operation is carried out, since the computer performs the above-explained rearrangement process, the resulting workload thereof would be increased. Thus, the computer could not supply sufficient capabilities to the editing/correcting works of the moving images, which should be originally performed.

As the fourth reason, a trade off relationship may be present between improvements in a data transfer speed and flexibility in a data rearrangement. If data are stored into continued storage regions (continuous storage regions) and further a plurality of disk storage units are usable, then the data are subdivided and the subdivided data are stored into these plural disk storage units. Then these subdivided data are accessed in a parallel mode, so that the data transfer speed can be increased.

However, to allocate the overall data into the continuous storage regions, such unused storage regions which are continued and own at least dimensions larger than, or equal to those of the data are required. If there is no such a large-sized continuous storage region, the following rearrangement should be frequently performed in order to secure such an unused storage region having at least the same size as that of the data, or equal thereto by collecting small unused storage regions. As a consequence, a lengthy time is necessarily required to carry out such a rearrangement, which would not be used in a practical case.

On the other hand, when a dimension of a continuous storage region is limited to a predetermined size, data is subdivided, and the subdivided data are stored in a plurality of continuous storage regions, since a dimension of each unused storage region is allowed to be larger than this limited dimension, flexibility in a data rearrangement can be increased. However, since seek time and rotation waiting time are produced at the boundaries of the continuous storage regions, the performance is lowered.

As described above, there is such a trade off problem between the transfer speed of the data and the flexibility of the data rearrangement. As a result, the dimensions of the conventional continuous storage regions are determined in such a manner that these dimensions are limited into such a range where the performance of the conventional disk apparatus can be satisfied.

However, in particular, when a data series is accessed, there is a problem that an access operation is commenced in an earlier time. That is, when the size of the continuous storage region of the disk has a predetermined limited value, seek time and rotation waiting time are produced at a boundary of the continuous storage region, during which the data transfer operation is interrupted.

To prevent this problem, as shown in FIG. 11a a buffer 200 is interposed between the disk 100 and the computer 300, so that the data transfer to the computer 300 can be continuously performed at a preselected transfer speed. This operation is comparable to such an example that water is intermittently poured into a water bath from one side by using a bucket, and water is sucked therefrom at the other side by using a hose.

A graphic representation shown in FIG. 11b represents a relationship between time and a transfer speed of data transferred from the disk 100 to the buffer 200. The abscissa indicates the time and the ordinate shows an amount of data transferred per unit time (transfer speed). As described above, the data are intermittently transferred from the disk 100 to the buffer 200.

Another graphic representation shown in FIG. 11c denotes a relationship between time and a transfer speed of data transferred from the buffer 200 to the computer 300. The abscissa shows the time and the ordinate indicates the data transfer speed. As shown in this graphic representation, since the transfer speed from the disk 100 to the buffer 200 and the transfer speed from the buffer 200 to the computer 300 are set to preselected values, the data can be continuously transferred from the buffer 200 to the computer 300.

It should be noted that to operate the mechanism shown in FIG. 11a under better conditions, when the data is transferred from the disk 100 to the buffer 200, the data transfer operation from the buffer 200 to the computer 300 should be delayed until such an amount of data has been stored, which exceeds a product value of "Tw×TRc", namely the longest interrupt time (Tw) corresponding to the longest time during which the data transfer operation is interrupted is multiplied by the transfer speed (TRc) at which the data is transferred via the buffer 200 to the computer 300. Otherwise, while the data transfer operation from the disk 100 to the buffer 200 is interrupted, the data transfer operation from the buffer 200 to the computer 300 is continued and thus there is no data stored in the buffer 200, resulting in a so-called "under flow". As a result, the data transfer operation from the buffer 200 to the computer 300 is interrupted.

Apparent form the foregoing descriptions, in order to start the data transfer operation at earlier time, the dimension of the continuous storage region in the disk 100, into which the head portion of the data has been stored, is made large, and also the data transfer performance of the disk 100 during the commencement of the data transfer operation should be increased. On the other hand, as previously explained, when the dimension of the continuous storage region is made large, flexibility of the data arrangement is impaired, so that it is difficult to manage the data.

In particular, when data corresponding to moving images are stored, since a time period after an image reproduction is instructed until image data are actually outputted is required to be shortened, this problem should be solved.

As described above, in the conventional disk control apparatus, when the data are rearranged, the data must be moved and also the directory information should be changed. Therefore, there is a problem that the load given to the computer is increased.

In case that the same data is commonly shared by a plurality of data groups, when the shared data is rearranged, the directory information of all of these data groups which commonly share this same data should be rewritten. Accordingly, there is another problem that the load given to the computer is increased.

Also, when such rearrangements are carried out, e.g., data sequence changes, data adding, deleting, or substitution, the data should be rearranged in connection thereto, so that the load given to the computer is increased.

Furthermore, when the data are stored into such a relatively large continuous storage region of the disk, and then the data transfer speed is increased, the data rearrangement should be frequently performed so as to secure this relatively large continuous storage region, resulting in a lengthy time.

SUMMARY OF THE INVENTION

A disk control method according to the present invention is characterized by that in a disk control method for controlling a disk apparatus including a disk having a plurality of storage regions for storing data therein by way of an external apparatus, external address produced from said external apparatus are related to internal addresses indicative of positions of said storage regions; said external addresses are converted into said internal addresses related thereto; and said disk is accessed based on said internal addresses.

Also, a disk control method according to the present invention is characterized by that in a disk control method for controlling a disk apparatus including a disk having a plurality of storage regions for storing therein data and corresponding to internal addresses, a head portion of data is allocated to said storage regions which are continuous and larger than those of other portions.

Further, a disk control method according to the present invention is characterized in that in a disk control method for controlling a disk apparatus including a disk having a plurality of storage regions for storing therein data and corresponding to internal addresses, said disk apparatus includes a plurality of disks, a head portion of said data is subdivided into a plurality of subdivided data, and said subdivided data are allocated to said plurality of disks, the number of which is larger than that of other portions.

A disk control apparatus according to the present invention is featured by such a disk control apparatus for controlling a disk apparatus including a disk having a plurality of storage regions used to store therein data, comprising:

management means (e.g., conversion managing unit 504 of FIG. 1) for managing a correspondence relationship between external addresses and internal addresses indicative of positions of said storage regions; and conversion means (e.g., conversion unit 501 of FIG. 1) for converting a preselected external address into the internal address related thereto by said management means and for supplying said converted internal address to said disk.

Also, a disk control apparatus according to the present invention is featured by such a disk control apparatus for controlling a disk apparatus including a disk having a plurality of storage regions for storing therein data and corresponding to internal address comprising:

allocation means (e.g., conversion managing means 504 of FIG. 1) for allocating a head portion of data to said storage regions which are continuous and larger than those of other portions.

A further disk control apparatus according to the present invention is featured by that in a disk control apparatus for controlling a disk apparatus including a disk having a plurality of storage regions for storing therein data and corresponding to internal addresses, said disk apparatus includes a plurality of disks, and said disk control apparatus comprises allocation means (e.g., conversion managing unit 504 of FIG. 1) for subdividing a head portion of said data into a plurality of subdivided data, and also allocates said subdivided data to said plurality of disks.

In the disk control method, or the disk control apparatus according to the present invention, the data are stored in the plural storage regions corresponding to the internal addresses, the correspondence relationship between the external addresses and the internal address is established, and also a preselected external address is converted into the internal address corresponding thereto. Accordingly, the load of the computer caused by the data transfer operation can be reduced.

In the disk control method, or the disk control apparatus according to the present invention, the internal addresses are allocated to the continuous storage regions, and the data are moved based on this address allocation. Therefore, the access operation to the disk storage unit can be performed at high speeds.

In the disk control method, or the disk control apparatus according to the present invention, both the storage region allocation and the data transfer are carried out within such an empty time during which no access operation to the disk storage unit is carried out. As a consequence, even after the disk apparatus starts its operation, the performance can be sequentially improved without giving any load to the computer.

In the disk control method, or the disk control apparatus according to the present invention, the head portion of the data series having a predetermined dimension is allocated to the continuous storage regions. Accordingly, the waiting time required when the data transfer operation is commenced can be shortened.

In the disk control method, or the disk control apparatus according to the present invention, the head portion of the data series is subdivided into a plurality of subdivided data and these subdivided data are allocated to each of the plural disk storage units whose number is greater than that of other portions. As a result, the waiting time required when the data transfer operation is commenced can be shortened.

BRIEF DESCRIPTION OF THE DRAWINGS

The present invention will be apparent from the detailed description to be read in conjunction with the accompanying drawings, in which:

FIGS. 2A and 2B illustratively show functions of the conversion table 505 and the data arrangement table 506;

FIGS. 3A, 3B, and 3C are explanatory diagrams explaining the data rearrangement;

FIGS. 4A, 4B, and 4C are explanatory diagrams for explaining the method for dynamically performing the sequential rearrangements;

FIGS. 5A, 5B, and 5C are explanatory diagrams for explaining the transfer starting time;

FIGS. 6A, 6B, and 6C are explanatory diagrams for explaining the method for shortening the transfer starting time;

FIGS. 11A, 11B, and 11C are explanatory diagrams for explaining the function of the buffer during the data transfer from the disk.

DETAILED DESCRIPTION OF THE PREFERRED EMBODIMENTS

Figure 1:
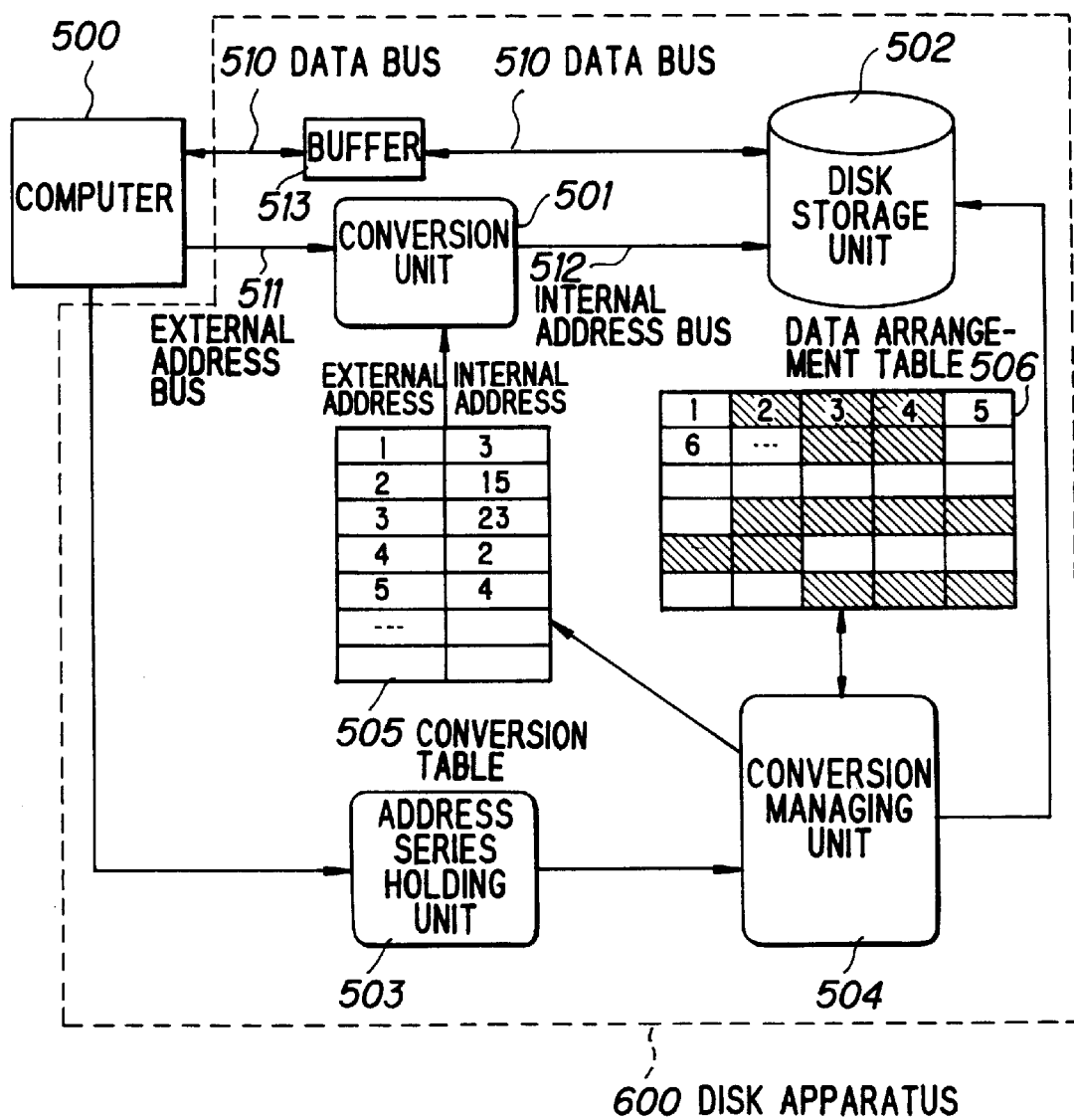
FIG. 1 is a schematic block diagram for indicating an arrangement of a disk control apparatus according to an embodiment of the present invention.
Figure 7A:
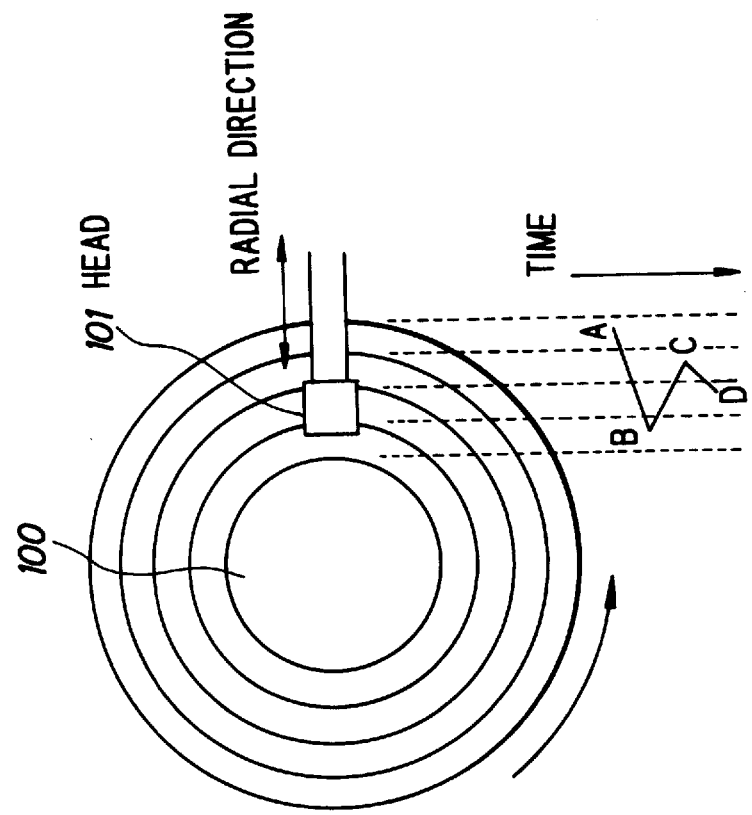
FIGS. 7A and 7B are explanatory diagrams for explaining the method for arranging data on the disk in the conventional disk control apparatus.
Figure 7B:
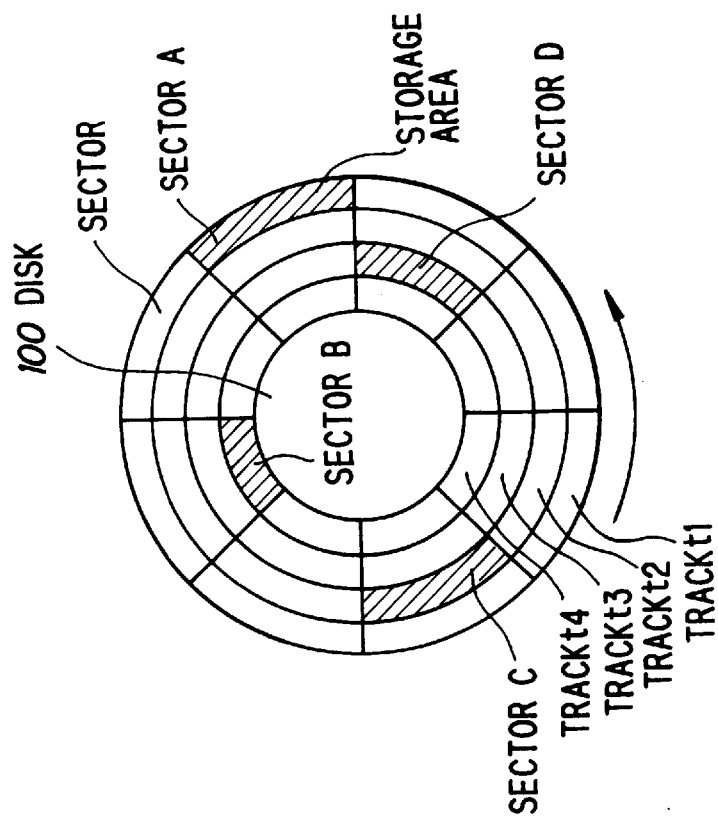
Figure 8:
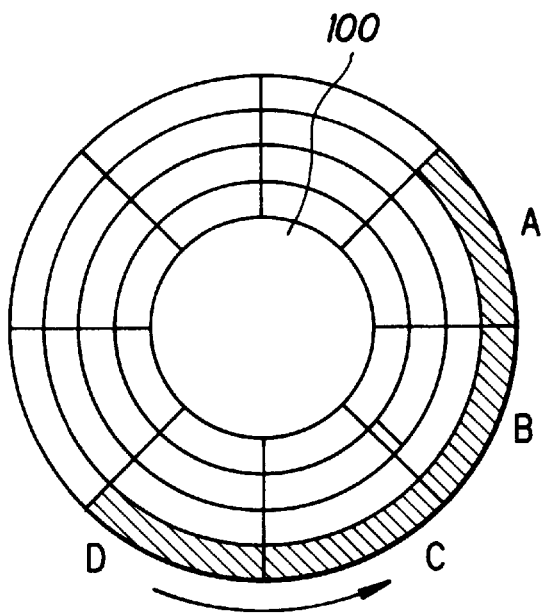
FIG. 8 is an explanatory diagram for explaining the data arrangement to the continuous storage regions on the disk.
Figure 9:
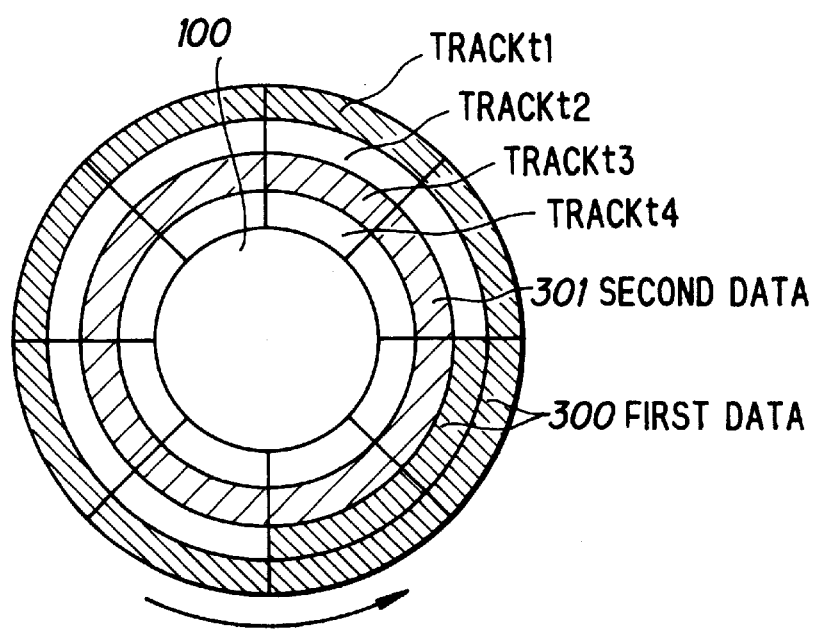
FIG. 9 is an explanatory diagram for explaining the data arrangement on the disk.
Figure 10A:
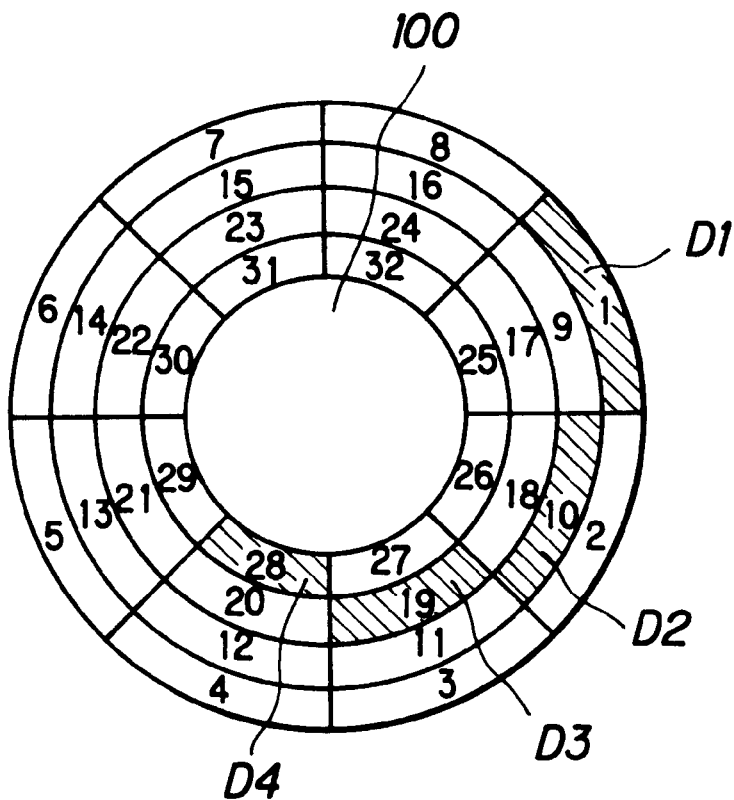
FIGS. 10A and 10B are explanatory diagrams for explaining the data arrangement and the directory information on the disk.
Figure 10B:
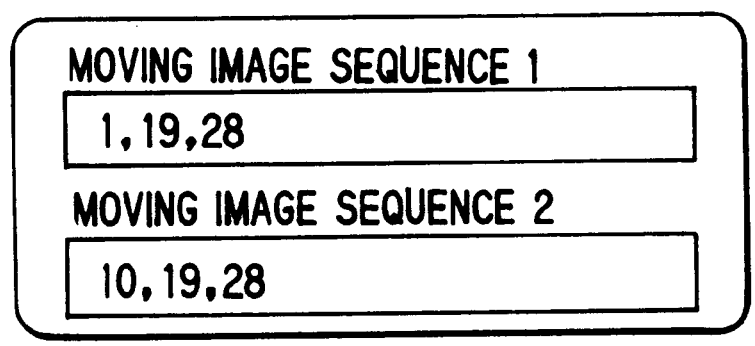

FIG. 1 is a block diagram for representing an arrangement of a disk apparatus according to an embodiment, to which a disk control apparatus of the present invention has been applied. A computer 500 supplies to an address series holding unit 503, an external address for accessing to a disk storage unit 502 constituting a disk apparatus 600. The address series holding unit 503 stores and holds therein the external address series previously supplied from the computer 500.

A translation table 505 is so designed that the external address supplied from the computer 500 can be stored in correspondence with an internal address for physically designating a storage region of the disk storage unit 502.

The data arrangement table 506 contains, for instance, an array element. This array element corresponds to an internal address, and this internal address corresponds to each of storage regions in the disk storage unit 502. Then, for example, either 1 or 0 is substituted for this array element. When a value of 1 is substituted for the array element, it is assumed that data is stored into a storage region corresponding to this array element. When a value of 0 is substituted for the array element, it is assumed that no data is stored in a storage region corresponding to this array element. As a result, these values may indicated as to whether or not data is stored into each of the storage regions of the disk storage unit 502.

A translation managing unit 504 can recognize an unused internal address based upon the data arrangement table 506, and then can form or update the conversion table 505.

A conversion unit 501 converts the external address supplied form the computer 500 via an external address bus 511 into the internal address based on the translation table 505, and then the internal address is supplied via an internal address bus 512 to the disk storage unit 502.

The disk storage unit 502 is constructed of either one or plural disks (not shown), a recording/reproducing head for recording/reproducing data on/from this disk, a drive unit for driving this recording/reproducing head, and a control circuit for controlling these elements. The disk storage unit 502 reads out the data from the storage region of the disk, corresponding to the internal address supplied from the conversion unit 501 via the internal address bus 512, and outputs the read data via a data bus 510 and a buffer 513 to the computer 500. Otherwise, this disk storage unit 502 writes the data supplied from the computer 500 via the data bus 510 and the buffer 513 into the storage region of the disk, corresponding to this internal address.

Next, this operation will be explained. When such a data is newly recorded which is wanted to be accessed at a high speed during the data reproducing operation under such a condition that continuous empty storage regions are sufficiently present in the disk, at first, the computer 500 previously stores a sequence (order) of data which are wished to be accessed at high speeds into the address series holding unit 503. This data sequence is given as a series of external addresses. As will be discussed later, the external addresses correspond to a preselected storage region of the disk employed in the disk storage unit 502 via internal addresses.

Then, a conversion managing unit 504 determines a location (internal address) of an actual storage region in such a manner that the transfer speed can be increased when the corresponding data is transferred in accordance with the sequence of the external address based on the sequence of the external address series stored in the address series holding unit 503, in other words, the data corresponding to the supplied external address series may correspond to the continuous storage regions (continuous regions) of the disk employed in the disk storage unit 502.

It is now assumed that a data sequence (external address series) [4, 1, 5] is instructed based on the external address. The conversion managing unit 504 refers to the data arrangement table 506 so as to find out such an internal address from the unused internal addresses, which can be continuously utilized, and then writes a correspondence between this internal address and the external address into the conversion table 505. Assuming now that the conversion managing unit 504 selects internal addresses [2, 3, 4], three sets of conversion data (1, 3), (4, 2), (5, 4) indicative of the correspondence between the external address and the internal address are written into the conversion table 505. FIG. 1 represents such a condition that this conversion data has been previously written.

After the conversion table 505 has been updated in such a manner, when the external address series [4, 1, 5] are successively supplied via the external address bus 511 to the conversion unit 501 by the computer 500, the conversion unit 501 converts this external address series into the internal address series [2, 3, 4] with reference to the conversion table 505. Then, this internal address series is supplied via the internal address bus 512 to the disk storage unit 502. Also, the computer 500 supplied data corresponding to the external address series [4, 1, 5] via the data bus 510 and the buffer 513 to the disk storage unit 502.

As previously explained, since the conversion managing unit 504 sets the internal address series corresponding to the continuous storage regions with respect to the external address series supplied by the computer 500 to the address series holding unit 503, very highspeed accessing operation can be achieved to the disk storage unit 502, and also the data can be written at high speed via the data bus 510 and the buffer 513 between the computer 500 and the disk storage unit 503.

When the data recorded in the above-described manner is read, the computer 500 designates the external address [4, 1, 5] and supplies this external address via the external address bus 511 to the conversion unit 501. The conversion unit 501 converts this external address [4, 1, 5] into an internal address [2, 3, 4] and supplies this internal address via the internal address bus 512 to the disk storage unit 502. The disk storage unit 502 reads out data from the storage region of the disk, corresponding to the supplied internal address [2, 3, 4] and then sends out this data to the data bus 510. As explained above, since the storage region of the disk corresponding to the internal address [2, 3, 4] constitutes the continuous storage region, a highspeed access operation can be done when the data is read out.

As described above, the computer 500 need not consider that the data is stored in the continuous region of the disk storage unit 502, but only the sequence of the data wanted to be accessed is previously supplied as the external address series into the address series holding unit 503, so that these data are arranged in the optimum locations (storage regions) of the disk by the conversion managing unit 504. Accordingly, the calculation load of the computer 500 can be reduced and further the disk storage unit 502 can be very easily managed by the computer 500.

Referring now to FIG. 2, a description will be made of such a case that there are not sufficiently present continuous empty storage regions in the disk. In accordance with this embodiment, data can be rearranged without increasing a load given to the computer 500. When present conditions of the data arrangement table 506 (shaded portions indicate such portions where data have been already arranged) and the conversion table 505 become such states as shown in FIG. 2a, it is assumed that a storage region corresponding to external address series [1, 2, 3, 4, 5] must be newly prepared.

In such a data arrangement as shown in the data arrangement table 506 of FIG. 2a, five sets of continuous storage regions could not be maintained. As a consequence, the conversion managing unit 504 instructs the disk storage unit 502 to transfer the data stored into the storage region corresponding to an internal address 13 to the storage region corresponding to an internal address 8, and thus the empty storage region indicated by internal address series [11, 12, 13, 14, 15] may correspond to the external address series [1, 2, 3, 4, 5].

Namely, first, the conversion managing unit 504 instructs the disk storage unit 502 to move the data stored in the storage region corresponding to the internal address 13 to the storage region corresponding to the internal address 8. Next, the mark (for instance, value 1) under use is recorded on the place of the data arrangement table 506, corresponding to the internal address 8, and further the conversion data (6, 13) (causing internal address 13 to correspond to external address 6) in the conversion table 505 is changed into (6, 8). As a consequence, the internal address 8 responds to the external address 6 (FIG. 2b).

Subsequently, as to the newly reserved regions of the internal addresses 11 to 15 marks under use are given to the corresponding portions in the data arrangement table 506, and the conversion data (1, 11), (2, 12), (3, 13), (4, 14), (5, 15) are written into the conversion table 505. FIG. 2b shows such data arrangement tables 506 and 505 in which the above-described operation has been performed. As a result, the continuous regions indicated by the internal address series [11, 12, 13, 14, 15] correspond to the external address series [1, 2, 3, 4, 5].

With the above-explained procedure, the continuous storage regions can be secured with respect to the external address series [1, 2, 3, 4, 5], so that the highspeed data transfer operation can be achieved. Furthermore, the computer 500 can access the data (whose internal address has been changed) transported to another storage region with employment of the same external address as those so far used.

For instance, the data which had been stored in the storage region related to the internal address 13 corresponding to the external address 6 has been moved to the storage region corresponding to the internal address 8, and in connection with this data transfer, the internal address 13 corresponding to the external address 6 of the conversion table 505 is changed into 8.

As described above, the conversion from the external address into the internal address by the conversion table 505 would absorb the address change by the data rearrangement. Accordingly, there is no need to change the directory information constructed of the external address on the side of computer 500 in connection with the data rearrangement. In other words, the data rearrangement for achieving the highspeed data transfer operation can be executed without giving any further load to the computer 500. Similarly, when another external address series is newly applied, the data are rearranged, so that optimum storage regions to this new external address series can be allocated.

Next, a description will now be made as to such a case when data is commonly shared, this data can be rearranged without increasing loads to be processed by the computer 500. Considering now such a case:

As represented in FIG. 2a, the data corresponding to the external address 6 is commonly shared by three sets of the below-mentioned external address series (data groups)

[6, 7, 8, 9],
[10, 6, 7, 20], and
[10, 11, 6, 7].

As explained above, in the conventional case, since this external address is identical to the internal address capable of directly designating the storage region, the external address 6 among all of the three external address series should be substituted for new addresses after the data rearrangement in connection with the data rearrangement. As explained above, the cost of data substitutions effected when the data is commonly shared by a large number of data groups (external address series) becomes especially large.

However, in this embodiment, since the conversion table 505 is employed, only the internal address of this conversion table 505, corresponding to the external address 6 is merely changed, and the external address series are no longer changed. As a consequence, the data can be rearranged without giving any adverse influence to the computer 500, irrelevant to the shared degrees of data.

Another case such as an editing work will now be considered in which data corrections, data replacements, and sequence changes are frequently performed.

Assuming now that, for instance, moving image (picture) data corresponding to an external address series [1, 2, 3, 4, 5, 6, 7, 8] has been stored into the continuous storage regions of the disk storage unit 502 as illustrated in a data arrangement table 506 and a conversion table 505 in FIG. 3a.

Considering now such a case that image data corresponding to the external address 2 is replaced by new image data. The computer 500 merely selects an unused external address 9 and may give a new external address series [1, 9, 3, 4, 5, 6, 7, 8] to the address series holding unit 503 of the disk apparatus 600 without considering the continuity of the data.

Subsequently, the data optimum to this address series is automatically rearranged by the disk apparatus 600. That is, the conversion managing unit 504 first instructs the disk storage unit 502 to transfer the data stored in the storage region corresponding to the internal address 2 to another storage region (in this case, internal address 11), changes the storage region corresponding to the internal address 2 into an empty region, and further updates the conversion table 505, so that this internal address 2 is related to the external address 9. Thereafter, new image data corresponding to the external address 9 is supplied from the computer 500 to be written into such a storage region corresponding to the internal address 2. FIG. 3b represents such data arrangement table 506 and conversion table 505, established after the image data has been replaced.

As explained above, since the data corresponding to the external address series [1, 9, 3, 4, 5, 6, 7, 8] are stored into the continuous storage regions, the highspeed data access operation can be achieved.

Furthermore, in order to produce short moving image data by deleting the image data of the external address 7, the computer 500 merely gives the following external address series to the address series holding unit 503 of the disk apparatus 600, namely such an external address series from which the external address 7 is deleted:

[1, 9, 3, 4, 5, 6, 8].

As a result, the data stored in the storage region of the internal address 7 corresponding to the external address 7 is moved to, for instance, an empty storage region corresponding to the internal address 12. Subsequently, the internal address corresponding to the external address 2 is set to 12. In addition, the data stored in the storage region of the internal address 8 corresponding to the external address 8 is transferred to the storage region corresponding to the internal address 7. Thereafter, the internal address corresponding to the external address 8 is set to 7.

FIG. 3c indicates such a result that the data optimized with respect to this external address series has been rearranged. This data rearrangement is, of course, executed inside the disk apparatus 600, which gives completely no influences to the computer 500.

That is, when the computer 500 arranges the external addresses in accordance with a desirable sequence and supplies the arranged external address to the address series holding unit 503 of the disk apparatus 600, this disk apparatus 600 executes the data rearrangement in order that the transfer speed becomes optimum when the data is accessed in the order of this external address. As a result, it can be viewed from the computer 500 that the disk apparatus 600 may function as such a storage unit capable of accessing to the desired data in unit of the external address in accordance with an arbitrary sequence, namely such a storage unit capable of accessing to the desired data at random.

As a consequence, on the side of the computer 500, the data can be stored without taking account of the physical locations of the storage regions and the continuity thereof. More specifically, when the data corrections and the data replacements are frequently performed, the storage regions employed in the computer 500 can be very simply managed. As a result, the process loads given to the computer 500, caused by the data rearrangement required to replace and change the data can be reduced.

Although the above-described explanation has been made of such a case that after the data has been previously rearranged, the accessing operation (data read/write operation) is commenced, the data rearrangement may be dynamically performed after the access of ration to the disk storage unit 502 is commenced.

Figures 4A, 4B, 4C:
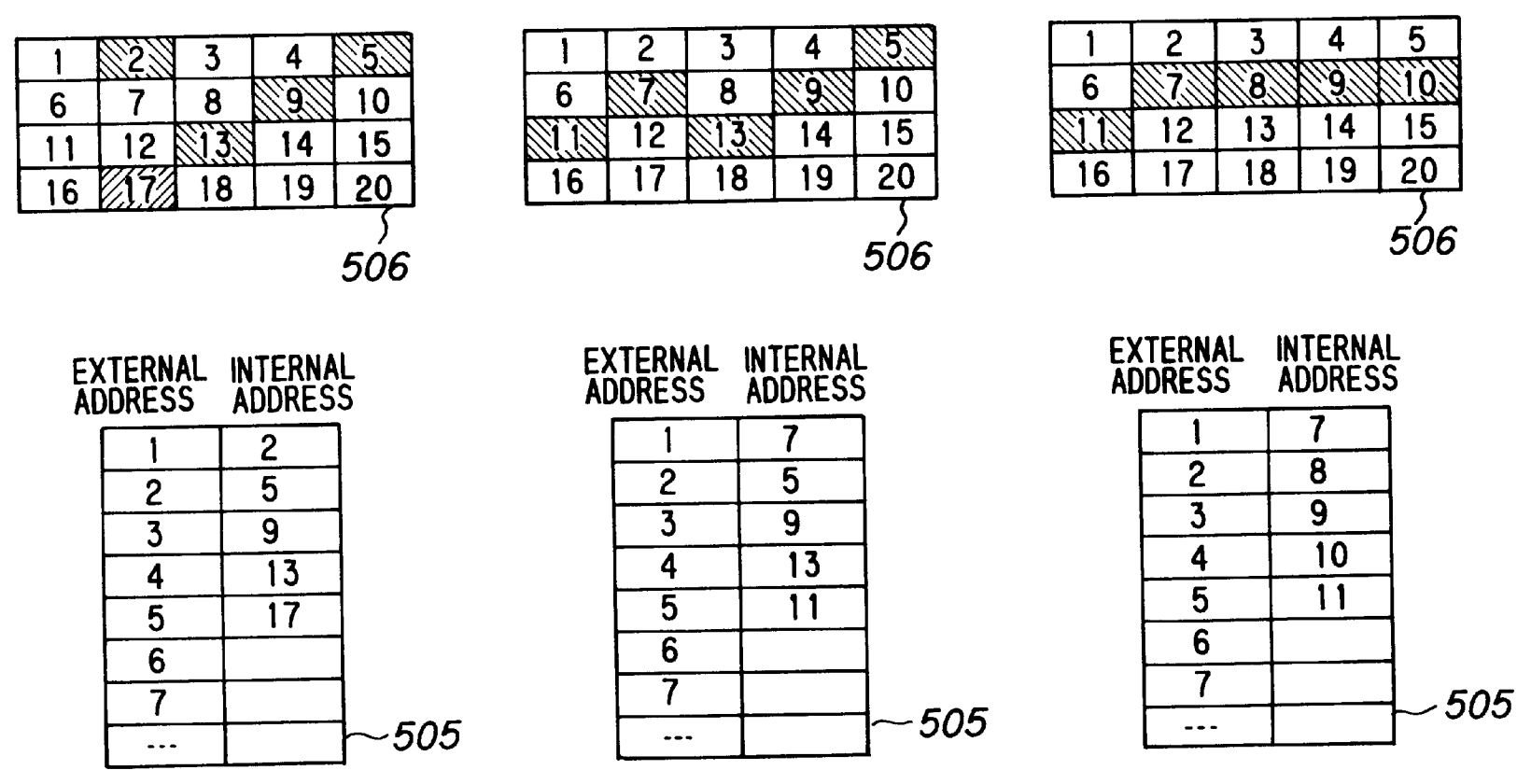

As an example, as illustrated in FIG. 4a, an internal address series (storage regions) corresponding to an external address series [1, 2, 3, 4, 5] is equal to [2, 5, 9, 13, 17], and an access operation to the disk storage unit 502 is provisionally commenced under such a dispersion condition. While utilizing interrupt time (empty time) of the accessing operation to the disk storage 502 (see FIG. 4D), the disk apparatus 600 transfers the data stored in the storage region corresponding to the internal address 2 into the storage region corresponding to the internal address 7, and also transfers the data stored in the storage region corresponding to the internal address 17 into the storage region corresponding to the internal address 11, respectively. Accordingly, as shown in FIG. 4b, these data approach to each other, and thus the accessing speed to the disk storage unit 502 may be improved.

Moreover, when the disk apparatus 600 transfers the data stored in the storage region corresponding to the internal address 5 into the storage region corresponding to the internal address 8, and also transfers the data stored in the storage region corresponding to the internal address 13 into the storage region corresponding to the internal address 10, respectively, the storage regions where the data are stored become completely continuous storage regions with respect to the given external address series, as shown in FIG. 4c, so that the highest data accessing operation can be achieved.

As previously described, when the conversion managing unit 504 sequentially rearranges the data while utilizing the empty time of the disk storage unit 502, even if the computer need not wait for the completion of the entire data rearrangement, the data can be accessed at the sequentially improved transfer speeds. Similar to the above-described case, the computer 500 completely need not change the external address in conjunction with the data rearrangement executed during this operation.

Next, for example, when a plurality of external address series, a portion of which is commonly shared, are given, there is a possibility that internal addresses corresponding to all of this external address series cannot be secured. For instance, when there are two sets of external address series:

[1, 2, 3, 4, 5] and
[1, 3, 5, 6, 7], if continuous storage regions are secured so as to be fitted to the first external address series, then storage regions corresponding to the head portion [1, 3, 5] of the second external address series would become such a discontinuous arrangement that these storage regions are arranged at every second storage location.

Conversely, if continuous storage regions are secured so as to be fitted to the second external address series, then the discontinuous storage regions are accessed as to the external address series [1, 2, 3, 4], although the storage regions corresponding to the external address series [1, 3, 5] are continuous.

In such a case, it is possible to increase the overall performance in such a way that the computer 500 gives priority orders to the external address series based on necessities of highspeed accessing operations, and the conversion managing unit 504 arranges such storage regions corresponding to the external address series having higher priority orders into the continuous storage regions with top priority (see FIG. 12).

In addition, in case when the continuity of the storage regions achieved in the above-described case cannot be secured, a portion of data is stored into a plurality of storage regions in a duplication mode, and different external addresses corresponding to the respective storage regions are separately utilized as the external address series. Accordingly, the storage regions corresponding to all of the external address series may be set to the continuous regions.

In this example, first of all, continuous storage regions are secured for the external address series [1, 2, 3, 4, 5]. Next, duplicated data corresponding to the external address series [1, 3, 5] is secured in another storage region. Then, if this storage region is continued to the storage region corresponding to the external addresses 6 and 7, then the continuous region may also be given to the second external address series.

While the above described explanation has been made of such a case that the data is rearranged by a single disk storage unit 502, a similar method to that of the above-described case may be applied to such a further case that a plurality of disk storage units 502 are located in the disk apparatus 600. In this case, the internal addresses of the conversion table 505 may be expressed by a portion for designating a predetermined disk storage and a portion for designating an address of a storage region within this predetermined disk storage.

Since, as explained above, the data can be rearranged over the plural disk storage units and the disk storage units are operated in parallel mode with respect to the specific external address series, a further highspeed data transfer operation can be achieved. It is of course that this data rearrangement can be executed without giving any adverse influences to the computer 500.

As previously explained, to increase a transfer speed, a long continuous storage region is required. The longer the continuous storage region is required, the more the data rearranging process operation becomes difficult. As a consequence, the dimension of the continuous storage region in the prior art is selected to be a predetermined value at which the performance of the disk apparatus can be satisfied.

FIG. 5a illustrates such an example that a quantity (namely, sector quantity) of continuous storage regions is selected to be similar to the prior art, and data are arranged on the disk storage unit 502. Storage regions 1, 2, 5, 6, 8, 9, 12, 13, 16, 17 and 20 shown in FIG. 5a are such storage regions which should be read in the continuous manner. Although the storage regions 1 and 2 are continuous, the storage region 6 is not continuous with the storage region 5. As a result, as explained above, seek time and rotation waiting time will occur, so that the resulting data transfer operation is discontinued as illustrated in the graphical representation of FIG. 5b.

To convert the data discontinuously transferred from the disk storage unit 502 into the data continuously transferred to the computer 500, a buffer 513 (similar to the buffer shown in FIG. 11) is employed. The data transfer operation is commenced after a preset data amount "D" of data has been stored into the buffer in order that this buffer is not brought into the empty condition while the data transfer operation from the disk storage unit 502 is temporarily interrupted.

Here, the data amount "D" may be selected so as to satisfy the following condition:

$$\text{Data amount } D \geq Tw \times TRc$$

assuming that the data transfer speed from the buffer 513 to the computer 500 is "TRc", and the maximum time when the data transfer operation from the disk storage unit 502 to the buffer 513 is interrupted is "Tw". In other words, even when the data transfer operation from the disk storage 502 to the buffer 513 is interrupted during only a predetermined time "Tw", this data amount "D" corresponds to such a data amount under which the data transfer operation from the buffer 513 to the computer 500 can be maintained during this interruption.

The graphical representation shown in FIG. 5c represents such a condition that after an instruction is issued to perform a data transfer operation from the disk storage 502, the data are stored into the buffer 513. The data transfer operation to the computer 500 is commenced after the amount of data stored in the buffer 513 has reached a predetermined data amount "D". A time period before this data transfer operation is commenced in defined as time Ts1.

FIG. 6a represents that a head portion of data series is arranged in more than three continuous storage regions. That is, the head portion of the data is stored into five continuous storage regions 1 to 5. Then, data of portions other than the head portion are stored into predetermined storage regions for every two sets of continuous storage regions.

In this case, a relationship between the data transfer speed and the time is shown as the graphical representation of FIG. 6b. In this graphical representation, the ordinate indicates the transfer speed and the abscissa denotes the time. As seen from this graphical representation, the head portion of the data (namely, data stored in storage regions 1 to 5) is continuously transferred at a preselected transfer speed only during a predetermined time.

FIG. 6c shows a relationship between time and an amount of data stored in a buffer. The ordinate shows the amount of data stored in the buffer, whereas the abscissa indicates the time. It should be noted that time Ts2 required that the data amount of the buffer is equal to a preselected value D is shorter than the time Ts1 shown in the graphical representation of FIG. 5c.

As a consequence, since the head portion of the data series is stored into such longer continuous regions than other continuous regions, the amount of data stored in the buffer can quickly reach the preselected value D, and also the time duration after the computer 500 issues the instruction of the data transfer operation until the data transfer operation to the computer 500 is commenced can be shortened.

Similar to the prior art manner, as to the data other than the head portion of the data series, such an amount of data hereinafter "continuous region length (L)" is set that the data are continuously transferred in order that an average disk transfer speed is not lower than the transfer speed (TRc) to the computer 500.

Assuming now that the transfer speed of the disk storage unit 502 is TRd and the maximum interrupt time of the data transferred from the disk storage 502 to the buffer 513 is Tw, since the continuous region length of the disk is equal to "L", at least the data of the disk storage unit 502 corresponding to the continuous region length "L" are continuously transferred from the disk 502 to the buffer 513.

In the worst case, since the data transfer operation from the disk storage unit 502 to the buffer 513 is interrupted only during the maximum interrupt time Tw, such an amount of data which should be originally transferred during this interrupt time Tw are not transferred, namely a data amount (Tw×TRd) obtained by multiplying this maximum interrupt time (Tw) by the transfer speed (TRd).

As a consequence, a ratio of an averaged data transfer speed (TRda) from the disk storage unit 502 to the buffer 513 with respect to the transfer speed (TRd) from the disk storage unit 502 to the buffer 513 is equal to such a value obtained by dividing the continuous region length (L) by a data amount (L+Tw×TRd) produced by adding an amount (Tw×TRd) of data transferable in the time (Tw) during which no data is transferred to this continuous region length (L).

As apparent from the foregoing descriptions, the averaged data transfer speed "TRda" from the disk storage unit 502 to the buffer 513 is expressed by the following formula (1):

$$TRda = [L/\{L+(Tw \times TRd)\}] \times TRd = (L \times TRd)/(L+TW \times TRd) \quad (1)$$

Therefore, in order that the data transfer operation from the buffer 513 to the computer 500 is not interrupted, the averaged data transfer speed "TRda" from the disk storage unit 502 to the buffer 513 must be selected to be greater than, or equal to the transfer speed from the buffer 513 to the computer 500. In other words, the below-mentioned relationship defined by formula (2) should be satisfied:

$$TRda \geq TRc \quad (2)$$

Accordingly, the continuous region length "L" is set to such a minimum value within a range capable of satisfying the following formula (3) obtained by substituting the formula (1) for the formula (2):

$$(L \times TRd)/(L+Tw \times TRd) \geq TRc \quad (3)$$

As previously described, as to the head portion of the data, the continuous storage regions larger than the value D are secured, so that the transfer starting time can be shortened. Only the head portion of the data is allocated to the large continuous region and other portions thereof are allocated to the relatively small continuous storage regions similar to the prior art, with the result that the transfer starting time to the computer 500 can be shortened without deteriorating flexibility of the data arrangement.

Furthermore, when a plurality of disk storage units 502 are present, the head portion of the data is subdivided into the plural data portions. Then, these plural data portions are distributed into a plurality of disk storage units 502, and are read out in a parallel manner, so that the transfer speed for the head portion of the data can be further increased. As a consequence, the transfer starting time can be further shortened.

For instance, in case that the head portion of the data is distributed to be stored into the continuous storage regions of "n" pieces of disk storage units 502 (symbol "n" being an arbitrary natural number), the dimensions of the respective continuous regions of the disk storage units 502 required to store a preselected data amount "D" of the head portion of the data are equal to D/n, respectively. Thus, the lengths of the respective continuous regions of the disk storage units 502 into which the head portion of the data is stored can be shortened, and also a difference between the above-described length of the respective continuous regions and the length of the continuous storage regions into which the data portions other than the head portion are stored can be made small. Consequently, flexibility of the data arrangement can be increased.

The above-described method may be realized under such a condition that the computer 500 is not loaded. That is, when the external address series is given as, for example, [1, 2, 3, 4, 5, 6, 7, 8, 9, 10, 11], the conversion managing unit 504 secures the storage regions in such a manner that the head external addresses series [1, 2, 3, 4, 5] are continuous, and the remaining external address series [6, 7], [8, 9] and [10, 11] are allocated to such continuous storage regions which are not located adjacent to each other. Consequently, the transfer starting time can be shortened as well as flexibility of the data arrangement can be achieved.

Such a data arrangement can be performed without giving any adverse influences to the computer 500.

As described above, in accordance with the above-described embodiment, the external address is converted into the internal address by the conversion unit 501, and such a conversion table 505 is formed or changed by the conversion managing unit 504, which indicates the conversion method when the external address is converted with the internal address by the conversion unit 501.

Accordingly, the conversion managing unit 504 can determine the optimum data storage positions in the disk storage unit 502 without changing the external address supplied from the computer 500. Therefore, the disk apparatus 600 can perform the data rearrangement so as to increase the data transfer speed without giving any cumbersome workload to the computer 500.

As a result, the data rearrangement which constitutes very large workloads in the conventional system can be released from the computer 500, so that the present invention may be utilized in such a utilization that the higher data transfer speeds are required as in the moving image process operation.

Even in such a utilization that the data change, the sequence substitution, and the sequence change frequently happen to occur, the load of the computer 500 caused by the data rearrangement can be lowered.

Furthermore, this data rearrangement may be sequentially performed by utilizing the empty time of the disk storage unit 502. In such a case, the computer 500 may start to use the disk storage unit 502 without waiting for the completion of the data rearrangement.

Also, since the long continuous storage region is especially allocated to the head portion of the data, the data transfer starting time to the computer 500 can be shortened, as compared with that of the prior art. Furthermore, since the disk apparatus 600 automatically performs the data rearrangement in order to shorten the waiting time until the data transfer operation is commenced, the load of the computer 500 can be reduced.

As previously explained, since the data are stored in the plural storage regions corresponding to the internal addresses, the correspondence relationship between the external addresses and the internal addresses is established, and also a preselected external address is converted into the internal address corresponding thereto, the load of the computer caused by the data transfer operation can be reduced.

Also, since the internal addresses are allocated to the continuous storage regions, and the data are moved based on this address allocation, the access operation to the disk storage unit can be performed at high speeds.

Then, since both of the storage region allocation and the data transfer are carried out within such an empty time during which no access operation to the disk storage unit is carried out, even after the disk apparatus starts its operation, the performance can be sequentially improved without giving any load to the computer.

Also, since the head portion of the data series having a predetermined dimension is allocated to the continuous storage regions, the waiting time required when the data transfer operation is commenced can be shortened.

Furthermore, as the head portion of the data series is subdivided into a plurality of subdivided data and these subdivided data are allocated to each of the plural disk storage units, the waiting time required when the data transfer operation is commenced can be shortened.

What is claimed is:

1. A disk control method for controlling a disk apparatus including a disk having a plurality of storage regions for storing data therein by way of an external apparatus, comprising:
    relating external addresses produced from said external apparatus to internal addresses indicative of positions of said storage regions;
    converting said external addresses into said internal addresses related thereto;
    accessing said disk based on said internal addresses;
    storing an external address series constructed of said plurality of external addresses; and
    updating and allocating said internal addresses to said external addresses based on said external address series.

2. The disk control method as claimed in claim 1 wherein:
    said internal addresses are allocated to continuous storage regions, and said data are transferred based on said allocations.

3. The disk control method as claimed in claim 2 wherein:
    both of said allocations of said internal addresses to said external addresses and said data transfer are carried out within interrupt time during which no access operation to said disk is carried out.

4. The disk control method as claimed in claim 1 wherein:
    priority orders are given to said data of said external address series, and the data having the higher priority order is allocated to said storage region at top priority.

5. A disk control apparatus for controlling a disk apparatus including a disk having a plurality of storage regions used to store therein data, comprising:

management means for managing a correspondence relationship between external addresses and internal addresses indicative of positions of said storage regions;

conversion means for converting a preselected external address into the internal address related thereto by said management means and for supplying said converted internal address to said disk; and address series holding means for holding an external address series constructed of said plurality of external addresses, wherein said management means updates and allocates said internal addresses to said external addresses based upon said external address series held by said address series holding means.

6. The disk control apparatus as claimed in claim 5 wherein:

said management means allocates said internal addresses to said continuous storage regions, and transfers said data based on said allocations.

7. The disk control apparatus as claimed in claim 6 wherein:

said management means performs both of said allocations of said internal addresses to said external addresses and said data transfer within interrupt time during which no access operation to said disk is carried out.

8. The disk control apparatus as claimed in claim 5 wherein:

said management means gives priority orders to said data, and allocates the data having higher priority orders to said storage regions with top priority.

* * * * *